United States Patent
Wishman et al.

(10) Patent No.: US 9,915,992 B1
(45) Date of Patent: Mar. 13, 2018

(54) DYNAMIC ADDRESSING WITH SHARED DATA BUS

(71) Applicant: Amazon Technologies, Inc., Seattle, WA (US)

(72) Inventors: Max Jesse Wishman, Seattle, WA (US); Jason Alexander Harland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 14/975,523

(22) Filed: Dec. 18, 2015

(51) Int. Cl.
*G06F 1/00* (2006.01)
*G06F 1/26* (2006.01)
*G06F 13/362* (2006.01)
*G06F 1/10* (2006.01)

(52) U.S. Cl.
CPC .............. *G06F 1/266* (2013.01); *G06F 1/10* (2013.01); *G06F 13/362* (2013.01)

(58) Field of Classification Search
CPC ........... G06F 1/10; G06F 1/266; G06F 13/362
See application file for complete search history.

(56) References Cited

U.S. PATENT DOCUMENTS

| | | | | |
|---|---|---|---|---|
| 6,745,270 B1* | 6/2004 | Barenys | ............. | G06F 13/4291 710/104 |
| 2003/0131177 A1* | 7/2003 | Ng | ....... | G06F 13/4022 710/313 |
| 2003/0140124 A1* | 7/2003 | Burns | .................... | H04L 45/00 709/220 |
| 2003/0236916 A1* | 12/2003 | Adcox | ............. | H04L 29/12018 709/245 |
| 2008/0246341 A1* | 10/2008 | Pelley | ....................... | H02J 1/10 307/80 |
| 2013/0293013 A1* | 11/2013 | Templeton | .............. | G06F 1/266 307/64 |

\* cited by examiner

*Primary Examiner* — Phil Nguyen
(74) *Attorney, Agent, or Firm* — Kilpatrick Townsend & Stockton LLP

(57) ABSTRACT

A controller may drive a first digital value onto a first address terminal of a first peripheral. The controller may transmit a data message on a data bus while driving the first digital value onto the selected address terminal. The first peripheral is coupled with the data bus, in accordance with at least one embodiment. A second peripheral having a second address terminal may also be coupled to the data bus. The first peripheral may be configured to accept the data message over the data bus when the first digital value is received on the first address terminal. The second peripheral may be configured to accept the data message over the data bus when the first digital value is received on the second address terminal.

12 Claims, 5 Drawing Sheets

DYNAMIC ADDRESSING WITH SHARED DATA BUS

BACKGROUND

Data centers house servers that serve web content and/or route network traffic. Servers rely on electric power generated from power supplies that are typically stored in close proximity to the servers or in some cases inside the server chassis. Preferably, the power provided is reliable and regulated. In some cases, two power supplies may power a server or group of servers so that the servers have power even if a power supply fails. The power supplies may include a data bus interface to send and receive messages so that the power supplies can be managed. The power supplies may be managed to control the overall heat output of the data centers, for example. Improvements to managing the power supplies are desirable.

BRIEF DESCRIPTION OF THE DRAWINGS

Various embodiments in accordance with the present disclosure will be described with reference to the drawings, in which.

DETAILED DESCRIPTION

Figure 1:
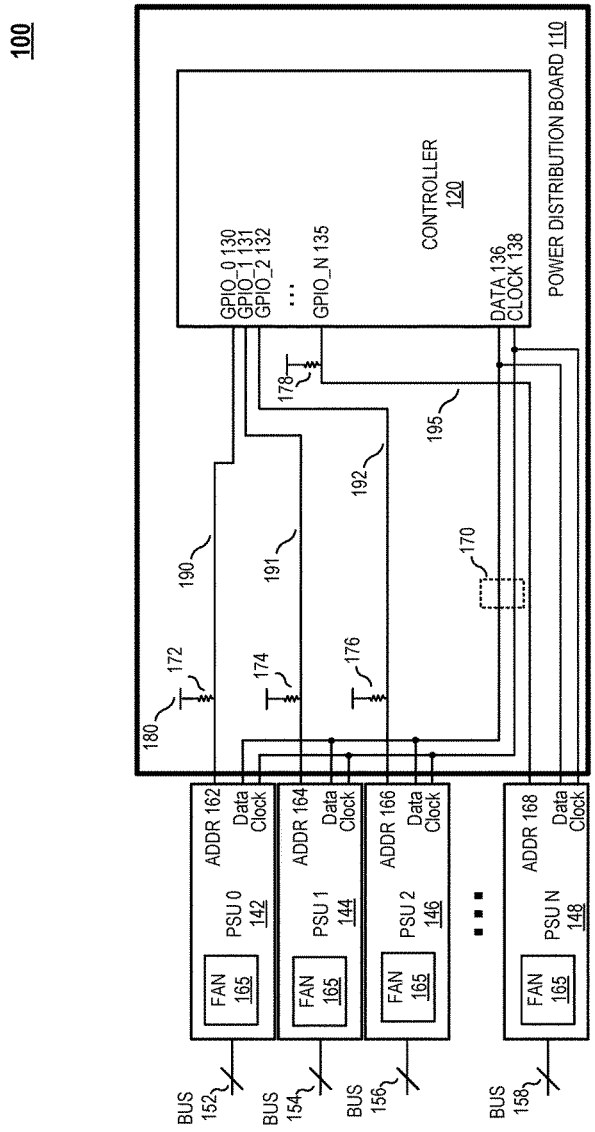
FIG. 1 illustrates an example system that includes a power distribution board and a plurality of power supply units in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods described herein include dynamically addressing peripherals that are coupled to a same data bus. Example peripherals include addressable temperature sensors, PCI (Peripheral Component Interconnect) cards, and/or power supply units. A controller is also coupled to the same data bus to send data messages to the peripherals. The controller may use its digital outputs to dynamically address the peripherals by driving address terminals of the peripherals to different logic levels. Conventionally, the addressing of peripherals is limited to the addressing terminals on each of the peripherals. For example, where a peripheral has one addressing terminal, only two peripherals may be addressed. Where a peripheral has two addressing terminals, a total of four peripherals coupled to a same data bus may be addressed. Thus, the number of peripherals coupled to the same data bus that can be addressed is limited to $2^n$, where n is the number of addressing terminals on each peripheral. The systems and methods of dynamically addressing described herein allow more than $2^n$ peripherals to share a same data bus so that the number of addressing terminals of a peripheral doesn't limit the number of peripherals that can share a data bus.

In a particular embodiment of the disclosure, power supply units (PSUs) are coupled to a same data bus. A controller is also coupled to the same data bus to send data messages to the power supply units. The controller may use its digital outputs to dynamically address the PSUs by driving address terminals of the PSUs to different logic levels. Conventionally, only two power supplies are managed to supply power to a server or group of servers. Two power supplies are currently used for redundancy. The two power supplies have static addresses. In one conventional scheme, a power supply unit in a top slot is statically addressed as unit zero by virtue of a pull-down resistor that pulls the address terminal of the power supply unit to digital zero (e.g. ground). And, a power supply unit inserted into a bottom slot is statically addressed as unit one by virtue of a pull-up resistor that pulls the address terminal of the power supply unit up to digital one (e.g. 3.3 VDC).

In contrast to the statically addressed power supplies, this disclosure includes a system that allows a controller to dynamically address power supply units or other peripheral devices that are designed to work with a limited number of addresses (e.g. two addresses). This allows for more than just two power supply units to supply power to the server(s), which can, for example, add to reliability of the system as well as enable more granular adjustment of power supplied to the server(s).

FIG. 1 illustrates a system 100 that includes a power distribution board 110 and a plurality of power supply units (PSUs). Power distribution board 110 includes a controller 120. Power distribution board 110 may include a printed-circuit-board (PCB). Controller 120 is coupled to a data bus 170 that includes a data line 136 and a clock line 138, in FIG. 1. The plurality of PSUs includes $PSU_0$-$PSU_N$, where N is the number of PSUs in the plurality of PSUs. In FIG. 1, $PSU_0$ 142, $PSU_1$ 144, $PSU_2$ 146, and $PSU_N$ 148 are illustrated. Each of the PSUs in the plurality of PSUs is coupled to both the data line 136 and clock 138 of data bus 170. In FIG. 1, data line 136 connects a data terminal of controller 120 to a data terminal of each of the plurality of PSUs and clock line 138 connects a clock terminal of controller 120 to each of the clock terminals of the plurality of PSUs. The clock signal may be driven by the clock terminal of controller 120 and received by the clock terminals of the PSUs. Data bus 170 may be implemented as an $I^2C$ bus, SMBus (System Management Bus), or PMBus (Power Management Bus), for example.

In FIG. 1, controller 120 includes a plurality of General Purpose Input/Outputs (GPIOs) and each PSU in the plurality of PSUs includes an addressing terminal. In accordance with at least one embodiment, the addressing terminal of a PSU is an input, and logic within the PSU may read the addressing terminal to determine what value is on the addressing terminal. Based on a value read on the addressing terminal, the PSU may determine its address and whether to accept or reject particular data messages sent over data bus 170. Controller 120 may be a Programmable Logic Device (PLD), in accordance with at least one embodiment. Controller 120 may be a processor, microprocessor, field-programmable-gate-array (FPGA), or otherwise. In FIG. 1, each GPIO of controller 120 has a one-to-one correspondence with one addressing terminal of a PSU. For example, GPIO_0 130 is coupled to addressing terminal 162, GPIO_1 131 is coupled to addressing terminal 164, GPIO_2 132 is coupled to addressing terminal 166, and GPIO_N 135 is coupled to addressing terminal 168, in FIG. 1.

In FIG. 1, address line 190 connects GPIO_0 130 and address terminal 162, address line 191 connects GPIO_1 131 and address terminal 164, address line 192 connects GPIO_2 132 and address terminal 166, and address line 195 connects GPIO_N 135 and address terminal 168. In the illustrated embodiment, pull-up resistors 172, 174, 176, and 178 pull up address lines 190, 191, 192, and 195, respectively, to a digital power rail 180. The digital power rail may be representative of a digital "high" having a digital value of one. In accordance with at least one embodiment, the digital power rail is 3.3 VDC. In accordance with at least one embodiment, pull-down resistors pull down the plurality of GPIOs to a ground plane representative of a digital "low" having a digital value of zero.

In some cases, each PSU in the plurality of PSUs includes a fan 165, in the illustrated embodiment. Fan 165 may be activated by the PSU to cool the PSU. Each PSU outputs a power bus that includes one or more power rails, in the illustrated embodiment. In FIG. 1, $PSU_0$ 142 outputs power bus 152, $PSU_1$ 144 outputs power bus 154, $PSU_2$ 146 outputs power bus 156, and $PSU_N$ 148 outputs power bus 158. Power buses 152, 154, 156, and 158 supply electric power to a server or a plurality of servers, in accordance with at least one embodiment. Example outputted power rails of the power buses may include 12 VDC, 5 VDC, and/or 3.3 VDC. Although not illustrated, inputs of the power supplies may include 120 VAC, 240 VAC, 48 VDC, and/or 315 VDC. The input AC voltages may be at a frequency between 50 and 60 Hz. Suitable power supplies may be sold by Delta Electronics, Flextronics, Emerson, or Corsair, in some examples.

Having more than one PSU supply power to a server or servers allows for redundancy in case a PSU were to fail, a backup PSU could continue supplying power to the servers. Additionally, having a plurality of PSUs may allow for power throttling corresponding to cyclical power requirements of the servers. When the servers are receiving high network traffic volume, they may require more power. Accordingly, PSUs from the plurality of PSUs can be called upon to supply more or less power, depending on the power requirements of the servers.

Controller 120 may send data messages to each PSU in order to, for example, activate (turn on), deactivate (turn off), or adjust a power output of a PSU. In accordance with at least one embodiment, adjusting the power output of a PSU includes setting a current output of the PSU. Controller 120 may also send a data message that instructs a PSU to adjust its fan 165 to cool the PSU, for example. Each PSU may also send a data message back to controller 120 that reports a state (e.g. a temperature or current output) of the PSU. A data message sent from controller 120 to a PSU is sent over data bus 170, in the illustrated embodiment. Also, a data message sent from a PSU to controller 120 is sent over data bus 170, in FIG. 1.

To send a data message to a particular PSU, controller 120 drives an address terminal of the particular PSU to a first digital value (e.g. digital low) and transmits the data message on the data bus 170, in accordance with at least one embodiment. The PSU that has its address terminal driven to the first digital value is the intended target of the data message transmitted on the data bus 170, while other PSUs in the plurality of PSUs, which receive a value other than the first digital value (e.g. digital high) on their address terminals, are not the intended target of the data message. In FIG. 1, controller 120 may select the intended target $PSU_0$ 142 by driving GPIO_0 130 low and transmitting a data message on data bus 170. Each PSU in the plurality of PSUs is configured to accept a data message transmitted on the data bus when its address terminal is driven low, in accordance with at least one embodiment. Hence, $PSU_0$ 142 accepts the data message sent over data bus 170 while its address terminal 162 is pulled low. Each PSU in the plurality of PSUs is configured to reject a data message transmitted on the data bus when its address terminal is driven high, in accordance with at least one embodiment. The address terminals 164, 166, and 168 of the non-targeted PSUs in the plurality of PSUs ($PSU_1$-$PSU_N$) receive a high value while address terminal 162 receives the digital low value. Therefore, the non-targeted PSUs (e.g. $PSU_1$-$PSU_N$) that are not selected reject the data message when their address terminals receive a digital value that is other than the first digital value.

In accordance with at least one embodiment, the data message sent from controller 120 to a target PSU includes data and a destination address. The data may be an actual command to the PSU that indicates a power level of a power bus, for example. The destination address may inform each of the plurality of PSUs what digital value on the address terminal of the power supply indicates a targeted PSU. For example, if a destination address in the header of a data message is a zero, each PSU may parse the destination address from the data message and compare it to the value on its address terminal to determine whether the data message is targeting the PSU. In one example, where the digital value (e.g. digital zero) on the address terminal matches the destination address (e.g. zero) of the PSU, then that PSU determines that the data message is targeting that PSU.

In accordance with at least one embodiment, one or more PSUs may be configured to send response data to controller 120 over data bus 170. Each PSU may send the response data to controller 120 when the address terminal of the PSU is pulled down by the corresponding GPIO line of controller 120. Controller 120 may drive a digital zero on only one GPIO at a time so that more than one PSU is not transmitting response data on data bus 170 at the same time. Rather, each PSU may be configured to only send response data (if any) to controller 120 after receiving a request message from controller 120 and while the address terminal is still pulled down from receiving the request message.

Hence, one potential advantage in accordance with at least one embodiment is an ability of controller 120 to dynamically address the plurality of PSUs by dynamically driving the outputs of controller 120 high and low. When controller 120 enables a particular PSU (by driving the address terminal high or low), the PSU can accept data messages from controller 120 and the PSU may also be able to send response data back to controller 120.

In accordance with at least one embodiment, the address lines coupled to the non-targeted PSUs are actively driven high so that the address terminals of the non-targeted PSUs have a digital high value, indicating that they are not the targeted PSU. In accordance with at least one embodiment, the pull-up resistors on the address lines are relied upon to pull the address lines high so that the non-targeted PSUs receive the digital high value. Although this disclosure may describe driving a digital low value onto an address line as indicating a targeted PSU, those skilled in the art understand that a digital high value may also be used to indicate a targeted PSU and a digital low value driven onto the address lines would indicate a non-targeted PSU.

Figure 2:
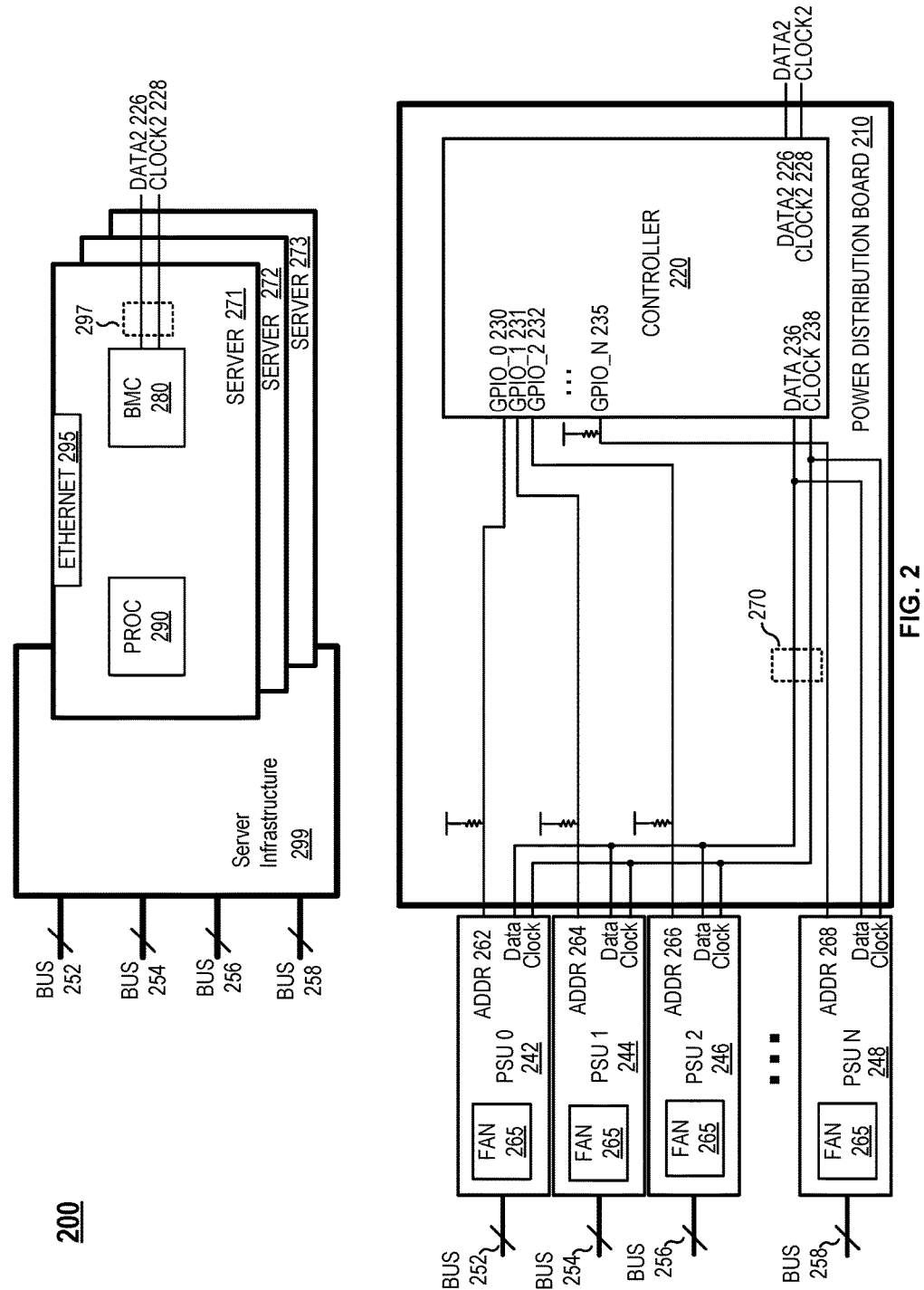
FIG. 2 illustrates an example system that includes server infrastructure, a power distribution board, servers, and a plurality of power supply units in accordance with at least one embodiment.

FIG. 2 illustrates a systems 200 that includes server infrastructure 299, power distribution board 210, servers, and a plurality of power supply units 242, 244, 246, and 248. Power distribution board 210 is an example of power distribution board 110 of FIG. 1 and power supply units 242, 244, 246, and 248 are examples of power supply units 142, 144, 146, and 148, respectively. Data bus 270 is an example of data bus 170. Power buses 252, 254, 256, and 258 are examples of power buses 152, 154, 156, and 158. Fans 265 are examples of fans 165.

In the illustrated embodiment, three servers 271, 272, and 273 are illustrated as having access to server infrastructure 299. The servers may be application servers or web servers, for example. Server infrastructure 299 may include ports or connectors to plug servers into as well as physical support (e.g. a rack) for the servers. The ports or connectors of server infrastructure 299 may provide electrical power to the servers, for example. Server infrastructure 299 is coupled to receive power buses 252, 254, 256, and 258 from the plurality of PSUs ($PSU_0$-$PSU_N$). In the illustrated embodiment, server 271 includes an ethernet interface 295 for sending and receiving network data. Server 271 also includes a main processor 290 to route network data or serve web content, for example. Server 271 further includes a Baseboard Management Controller (BMC) 280. Processor 290 and BMC 280 may be on the same motherboard of server 271. Servers 272 and 273 may be configured as server 271 is configured, or they may be configured differently.

In the illustrated embodiment, BMC 280 is coupled to management data bus 297, which includes data line 226 and clock line 228. Management data bus 297 may be implemented as an $I^2C$ bus, or SMBus (System Management Bus), for example. Controller 220 is also coupled to management data bus 297, in FIG. 2. BMC 280 is configured to send management messages to controller 220 over management data bus 297. Controller 220 may then send a data message to one or more PSUs in response to receiving the management message from BMC 280. The management message from BMC 280 may be a request to adjust the power supplied to server infrastructure 299 by power buses 252, 254, 256, and/or 258, for example. In accordance with at least one embodiment, the components of system 200 are located at a same physical site such as a data center. In accordance with at least one embodiment, BMC 280 measures a current (or receives a measurement of current) of a power rail of server 271. In response to the current measurement being below a threshold, BMC 280 may send a management message to controller 220 via data bus 297. The management message may instruct controller 220 to shut down a given PSU because of the low current draw of a server that corresponds to a lower workload of the server.

Although FIG. 2 illustrates data bus 297 being distinct and separate from data bus 270, embodiments of the disclosure may include data bus 270 being a continuation of data bus 297. In these embodiments, controller 220 receives a data message from BMC 280. The data message from BMC 280 may include a header field that indicates which PSU the data message is targeting. Controller 220 may analyze the header field and select the target PSU using the corresponding GPIO line. When the data message from BMC 220 is re-transmitted by controller 220 on data bus 270, only the intended PSU will accept the message since controller 220 will only pull down the addressing terminal (using the corresponding GPIO) of the intended PSU.

Figure 3:
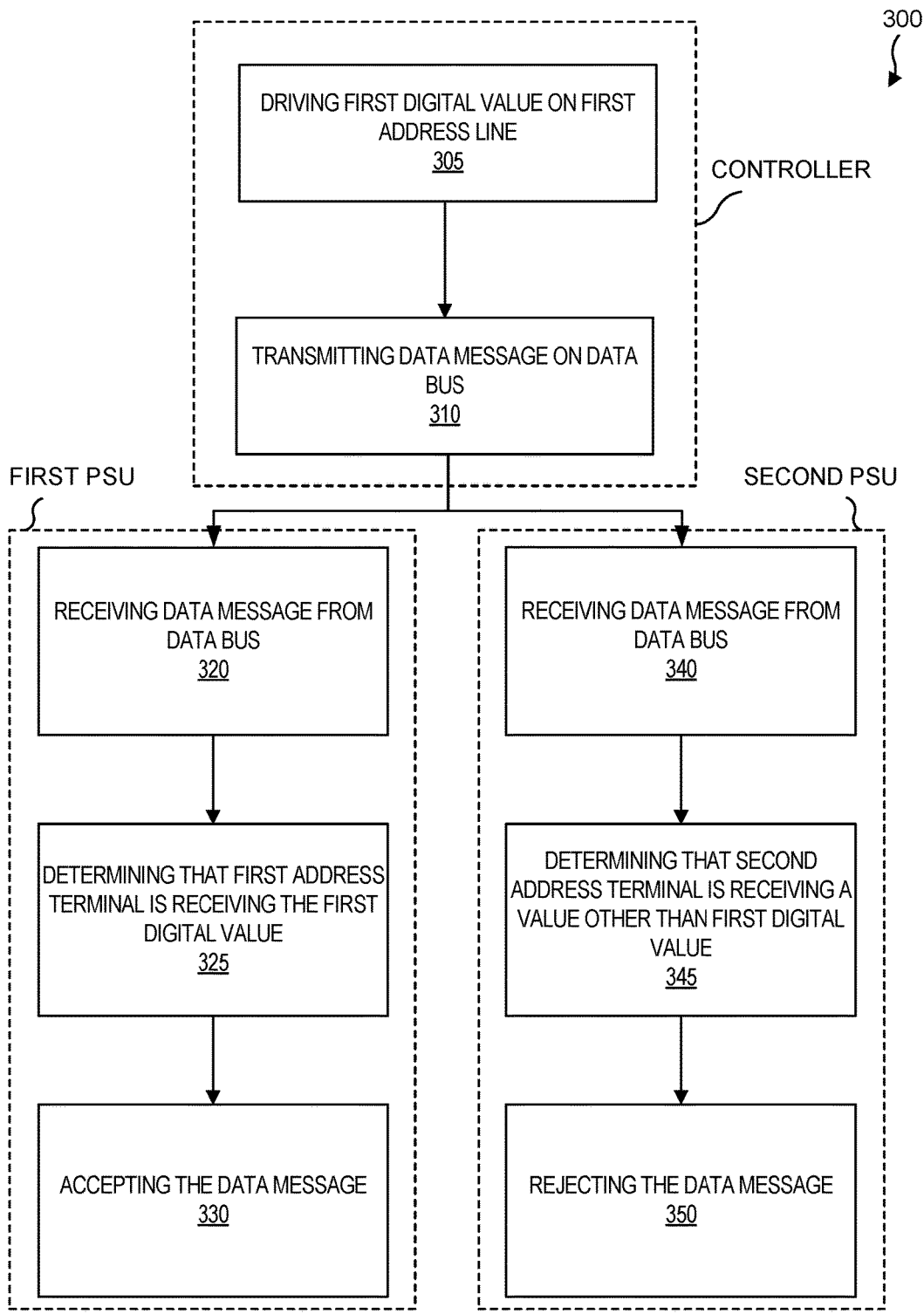
FIG. 3 depicts an illustrative flow chart demonstrating an example process for dynamically addressing power supply units that are coupled to a shared data bus in accordance with at least one embodiment.

FIG. 3 depicts an illustrative flow chart demonstrating an example process 300 for dynamically addressing PSUs that are coupled to a shared data bus. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory.

In process block 305, a controller (e.g. controller 120) drives a first digital value (e.g. zero) on a first address line (e.g. address line 190). The address line is coupled between a first output (e.g. GPIO_0 130) and a first address terminal (e.g. address terminal 162) of a first power supply unit (e.g. $PSU_0$ 142). In process block 310, a data message is transmitted onto a data bus (e.g. data bus 170) by the controller. The data message may be transmitted onto the data bus while the controller is driving the first digital value on the first address line.

In process block 320, the data message is received by a first PSU (e.g. $PSU_0$ 142). The first PSU is coupled to the data bus to receive the data message from controller 120. The first PSU determines that the first address terminal is receiving the first digital value, in process block 325. In process block 330, the data message is accepted by the first PSU if the first digital value is being received at the first address terminal, since the first digital value on the address terminal indicates that the first PSU is being targeted by the data message.

In process block 340, the data message is received by a second PSU (e.g. $PSU_1$ 144). The second PSU is coupled to the data bus to receive the data message from controller 120. The second PSU determines that the second address terminal is receiving a digital value that is other than the first digital value, in process block 345. For example, the second address terminal may be receiving a digital value of one, which is different from the first digital value of zero. In process block 350, the data message is rejected by the second PSU since the digital value on the second address terminal is other than the first digital value, indicating that the second PSU is not being targeted by the data message. The data message may be received by each PSU in a plurality of PSUs (e.g. $PSU_0$-$PSU_N$) that are coupled to the data bus. Each PSU that isn't targeted may also reject the data message by executing process blocks 340, 345, and 350.

Receiving a data message may include the PSU storing the data message in a temporary buffer for analysis. Accepting a data message may include executing further instructions that are responsive to data in the data message, whereas rejecting the data message may include ignoring (and possibly deleting the data message from a temporary buffer) the data message after determining that the data message is not targeting the particular PSU.

Figure 4:
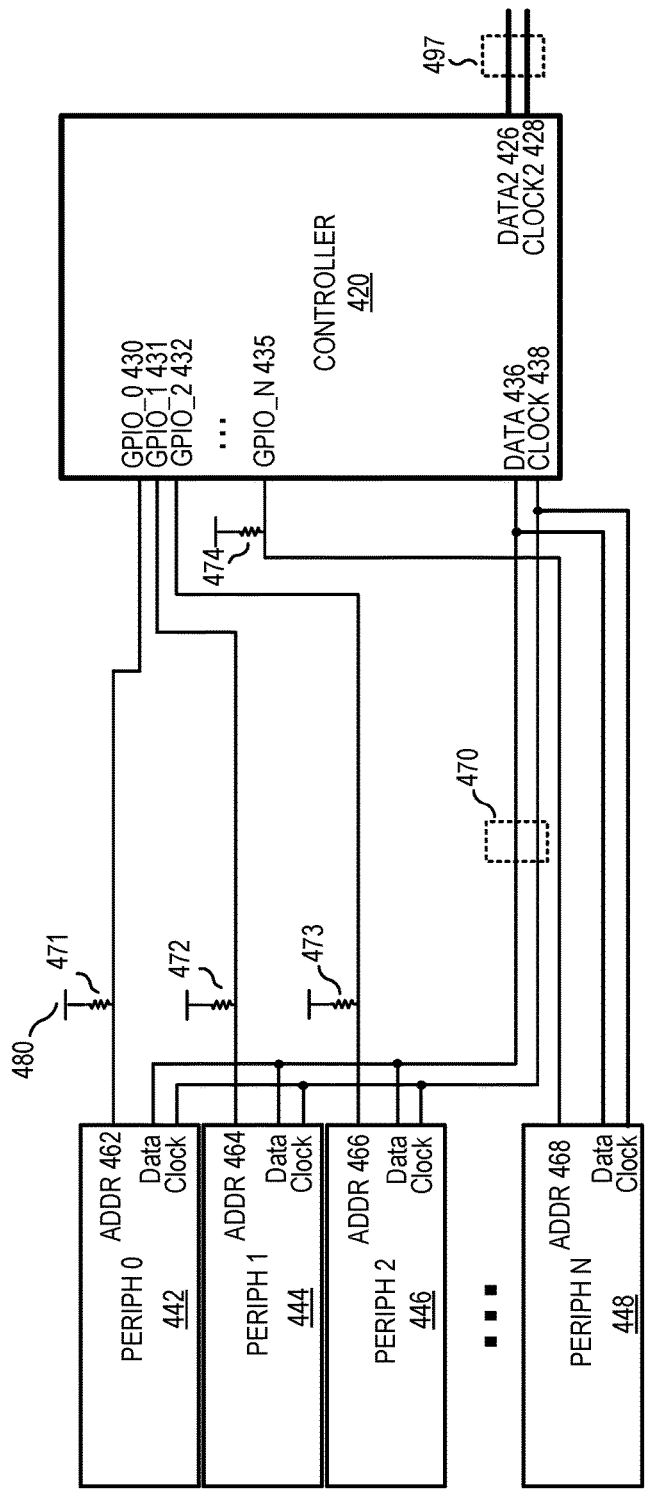
FIG. 4 illustrates an example system that includes a controller, a data bus, and a plurality of peripherals in accordance with at least one embodiment.

In further embodiments, the disclosed technologies can be used with devices other than PSUs. For example, FIG. 4 illustrates a system 400 that includes a controller 420 and a plurality of peripherals numbering N. The illustrated peripherals include peripherals, 442, 444, 446, and 448, which are each coupled to data bus 470. Data bus 470 includes data line 436 and clock line 438. Controller 420 is coupled to data bus 470 and management data bus 497, which includes data line 426 and clock line 428. Controller 420 is an example of controller 220 of FIG. 2, data bus 470 is an example of data bus 170 of FIG. 1, and management data bus 497 is an example of management data bus 297, in accordance with at least one embodiment. Pull-up resistors 471, 472, 473, and 474 are examples of pull-up resistors 171, 172, 173, and 174, respectively. Digital power rail 480 is an example of digital power rail 180.

In FIG. 4, each GPIO of controller 420 has a one-to-one correspondence with one addressing terminal of a peripheral. For example, GPIO_0 430 is coupled to addressing terminal 462, GPIO_1 431 is coupled to addressing terminal 464, GPIO_2 432 is coupled to addressing terminal 466, and GPIO_N 435 is coupled to addressing terminal 468, in FIG. 4.

At a high level, system 400 is similar to systems 100 and 200 of FIGS. 1 and 2, respectively. System 400 differs from systems 200 and 100 in that a plurality of peripherals is coupled to data bus 470 rather than having only PSUs coupled to a data bus. The illustrated peripherals may include addressable temperature sensors, PCI cards, and/or PSUs. In other words, the disclosed dynamic addressing using a shared data bus is applicable in contexts broader than communicating with a plurality of PSUs. Hence, controller 420 may send a data message to a peripheral in the plurality of peripherals by assigning a select address (e.g. digital zero) to the targeted peripheral by dynamically driving the address line of the selected peripheral to a first digital value (e.g. digital zero) while transmitting the data message on data bus 470. The non-targeted peripherals are assigned an unselect address (e.g. digital one) by the controller by driving a digital value (e.g. digital one) on the address line of the unselected peripherals. The digital value that corresponds with the unselect address is the inverse of the digital value that corresponds with the select address, in one embodiment.

Figure 5:
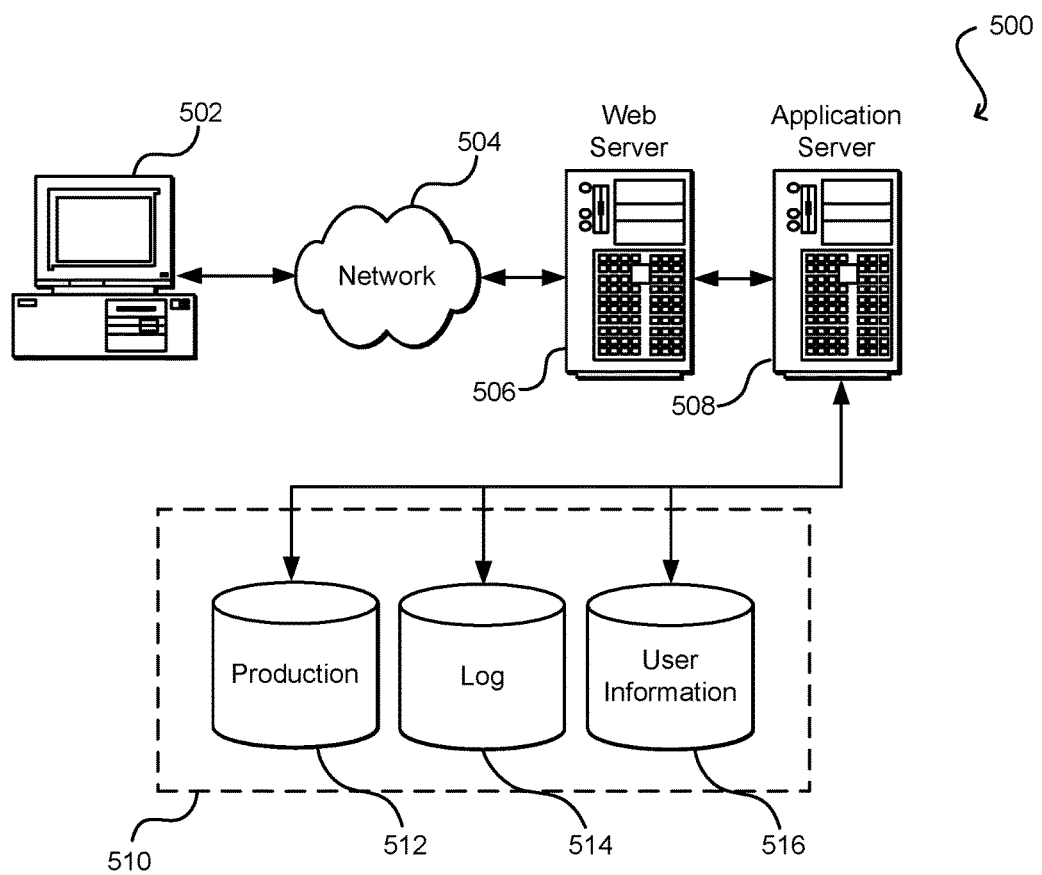
FIG. 5 illustrates an example environment for implementing aspects in accordance with various embodiments.

FIG. 5 illustrates aspects of an example environment 500 for implementing aspects in accordance with various embodiments. As will be appreciated, although a Web-based environment is used for purposes of explanation, different environments may be used, as appropriate, to implement various embodiments. The environment includes an electronic client device 502, which can include any appropriate device operable to send and receive requests, messages or information over an appropriate network 504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 506 for receiving requests and serving content in response thereto, although for other networks an alternative device serving a similar purpose could be used as would be apparent to one of ordinary skill in the art. Systems 100 and 200 may be implemented in web server 506.

The illustrative environment includes at least one application server 508 and a data store 510. Systems 100 and 200 may be implemented in application server 506. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 502 and the application server 508, can be handled by the Web server. It should be understood that the Web and application servers are not required and are merely example components, as structured code discussed herein can be executed on any appropriate device or host machine as discussed elsewhere herein.

The data store 510 can include several separate data tables, databases or other data storage mechanisms and media for storing data relating to a particular aspect. For example, the data store illustrated includes mechanisms for storing production data 512 and user information 516, which can be used to serve content for the production side. The data store also is shown to include a mechanism for storing log data 514, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 510. The data store 510 is operable, through logic associated therewith, to receive instructions from the application server 508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in accordance with at least one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server power system, the system comprising:
   a management controller of a server;
   a management data bus;
   a power supply controller having a plurality of digital outputs, the power supply controller configured to receive a management message from the management controller via the management data bus;
   a common data bus coupled with the power supply controller; and
   a plurality of power supply units for providing power to the server, wherein each power supply unit in the plurality of power supply units is coupled with the common data bus and includes a respective addressing terminal coupled with one of the plurality of digital outputs in a one-to-one correspondence, and wherein each power supply unit is configured to recognize exactly $2^n$ addresses, where n is a number of addressing terminals of the plurality of power supply units,
   and wherein, based on receiving the management message from the management controller, the power supply controller is configured to:
      select one of the plurality of power supply units for receiving a data message by driving a first digital value on a selected one of the plurality of digital outputs that is coupled with the respective addressing terminal of the selected power supply unit; and
      send the data message over the common data bus while driving the first digital value on the selected digital output,
   wherein each of the plurality of power supply units is configured to:
      accept the data message when receiving the first digital value on the respective addressing terminal; and
      reject the data message when receiving a second digital value on the respective addressing terminal, wherein the second digital value is different from the first digital value.

2. The system of claim 1, wherein the selected power supply unit is configured to adjust an electric power rail based on receiving the data message, the electric power rail providing power to the server.

3. The system of claim 1, wherein the data message includes data and a destination address, and wherein each of the plurality of power supply units is configured to determine when the destination address matches a digital value received on the respective addressing terminal of the power supply unit.

4. The system of claim 1, wherein the power supply controller is further configured to drive the second digital value on the digital outputs of the plurality of digital outputs that do not correspond to the respective addressing terminal of the selected power supply unit.

5. The system of claim 1, wherein the common data bus includes a clock line, and wherein each of the plurality of power supply units includes a clock terminal, the power supply controller including an additional clock terminal.

6. A system comprising:
   a power supply controller having a plurality of digital outputs, the power supply controller configured to:
      select one of a plurality of power supplies by driving a first digital value on a selected one of the plurality of digital outputs, the selected power supply being coupled with a data bus and including a respective addressing terminal coupled with a respective one of the plurality of digital outputs; and send a data message over the data bus while driving the first digital value on the selected digital output, wherein the selected power supply is configured to:

accept the data message when receiving the first digital value on the respective addressing terminal; and reject the data message when receiving a second digital value on the respective addressing terminal, wherein the second digital value is different from the first digital value; and a management controller coupled with the power supply controller via a second data bus that is separate from the data bus, wherein the power supply controller is configured to send the data message based on receiving a management message from the management controller over the second data bus.

7. The system of claim 6, wherein the data message includes data and a destination address, and wherein the selected power supply is configured to determine when the destination address matches the first digital value and accept the data message only when the destination address matches the first digital value.

8. The system of claim 6, wherein the selected power supply is configured to send response data back to the power supply controller on the data bus based at least in part on accepting the data message, wherein the response data is sent by the selected power supply when the first digital value is received on the respective addressing terminal of the selected power supply.

9. The system of claim 6, wherein the selected power supply is configured to adjust an electric power rail based on receiving the data message.

10. The system of claim 6, wherein the first digital value is a digital zero and the second digital value is a digital one, and wherein the plurality of digital outputs are each coupled to a digital power rail through a respective pull-up resistor.

11. The system of claim 6, wherein the first digital value is a digital one and the second digital value is a digital zero, and wherein each digital output in the plurality of digital outputs is coupled to a ground through a respective pull-down resistor.

12. The system of claim 6, wherein the data message includes instructions for the selected power supply to adjust a cooling fan of the selected power supply.

* * * * *